(12) United States Patent
Hamamoto et al.

(10) Patent No.: US 7,968,220 B2
(45) Date of Patent: Jun. 28, 2011

(54) NON-AQUEOUS ELECTROLYTIC SOLUTION AND LITHIUM SECONDARY BATTERY

(75) Inventors: Toshikazu Hamamoto, Yamaguchi (JP); Koji Abe, Yamaguchi (JP); Akira Ueki, Yamaguchi (JP)

(73) Assignee: UBE Industries, Ltd., Yamaguchi (JP)

( * ) Notice: Subject to any disclaimer, the term of this patent is extended or adjusted under 35 U.S.C. 154(b) by 0 days.

(21) Appl. No.: 12/605,490

(22) Filed: Oct. 26, 2009

(65) Prior Publication Data
US 2010/0079110 A1 Apr. 1, 2010

Related U.S. Application Data

(60) Continuation of application No. 11/249,815, filed on Oct. 12, 2005, now abandoned, which is a division of application No. 09/865,608, filed on May 25, 2001, now abandoned.

(30) Foreign Application Priority Data

May 25, 2000 (JP) .................................. 2000-154461

(51) Int. Cl.
*H01M 10/056* (2010.01)
(52) U.S. Cl. ............ 429/50; 429/326; 429/338; 429/341
(58) Field of Classification Search .................... 429/50, 429/338, 339, 341, 342, 326
See application file for complete search history.

(56) References Cited

U.S. PATENT DOCUMENTS

| | | | |
|---|---|---|---|
| 5,879,834 A | 3/1999 | Mao | |
| 6,074,776 A | 6/2000 | Mao et al. | |
| 6,074,777 A | 6/2000 | Reimers et al. | |
| 6,534,218 B1 | 3/2003 | Okada et al. | |

FOREIGN PATENT DOCUMENTS

| | | | |
|---|---|---|---|
| JP | 63-102173 A | 5/1988 | |
| JP | 7302614 A | 11/1995 | |
| JP | 10-321258 A | 12/1998 | |
| JP | 11-329493 A | 11/1999 | |

OTHER PUBLICATIONS

Certified Translation of JP 11-329493A—Nov. 1999.*
Martin Winter et al, Graphites for Lithium-ion Cells: The Correlation of the First-Cycle Loss with the Brunauer-Emmett-Teller Surface Area, J. Electrochem. Soc., vol. 145, No. 2. Feb. 1998, p. 428-429.

* cited by examiner

*Primary Examiner* — Gregg Cantelmo
(74) *Attorney, Agent, or Firm* — Jules E. Goldberg

(57) ABSTRACT

A non-aqueous electrolytic solution favorably employable for a lithium secondary battery employs a non-aqueous electrolytic solution which comprises a non-aqueous solvent and an electrolyte which further contains 0.001 to 0.8 weight % of a biphenyl derivative having the formula:

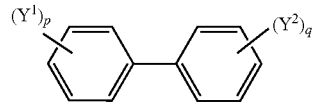

in which each of $Y^1$ and $Y^2$ represents hydroxyl, alkoxy, hydrocarbyl, hydrogen, acyloxy, alkoxycarbonyloxy, alkylsulfonyloxy, or halogen, and each of p and q is an integer of 1 to 3.

6 Claims, No Drawings

NON-AQUEOUS ELECTROLYTIC SOLUTION AND LITHIUM SECONDARY BATTERY

This is a continuation of prior U.S. patent application Ser. No. 11/249,815 entitled "Non-Aqueous Electrolytic Solution and Lithium Secondary Battery" filed Oct. 12, 2005, now abandoned, which is a divisional of U.S. patent application Ser. No. 09/865,608 filed May 25, 2001, now abandoned, all applications are incorporated herein by reference.

FIELD OF THE INVENTION

The present invention relates to a non-aqueous electrolytic solution and a lithium secondary battery employing the non-aqueous electrolytic solution. In particular, the invention relates to a lithium secondary battery having improved electric capacity and cycling performance, and a non-aqueous electrolytic solution which is advantageously employable for preparing the lithium secondary battery.

BACKGROUND OF THE INVENTION

At present, portable small electronic devices such as personal computers, cellular phones, and video recorders equipped with camera are widely used, and a small sized secondary battery having light weight and high electric capacity is desired to provide an electric source for driving such small electronic devices. From the viewpoints of small size, light weight, and high electric capacity, a lithium secondary battery is paid attention.

The lithium secondary battery employs a positive active electrode material comprising a complex oxide such as lithium cobaltate, lithium nickelate, or lithium manganate, a negative active electrode material comprising a carbonaceous material such as graphite into which lithium ions are able to intercalate and from which lithium ions are able to escape, and a non-aqueous electrolytic solution of a lithium salt in a non-aqueous solvent comprising a cyclic carbonate and a linear chain carbonate. The lithium secondary battery is now studied for improving its performances.

The lithium secondary battery employing $LiCoO_2$, $LiMn_2O_4$, or $LiNiO_2$ as the positive electrode active material is generally used under such condition that the electric charge-discharge procedure is repeated in the range up to the maximum operating voltage exceeding 4.1 V. In the procedure, the conventional lithium secondary battery is apt to gradually lower in its electric capacity when the charge-discharge cycle is repeated for a long period. It is supposed that this trouble is caused by oxidative decomposition of a portion of the non-aqueous solvent of the electrolytic solution on the surface of the positive electrode when the maximum operating voltage exceeds 4.1 V, and the decomposition product disturbs the desired electrochemical reaction in the battery. Therefore, the conventional lithium secondary batteries are not satisfactory in their battery performances such as the cycling performance and an electric capacity when the batteries are operated in the charge-discharge cycles of which maximum operating voltage exceeds 4.1 V.

U.S. Pat. No. 5,879,834 describes incorporation of an aromatic additive such as biphenyl, 1,3-chlorothiophene, or furan into a non-aqueous rechargeable lithium battery. The additive is used in an amount of about 1% to 4%. The aromatic additive is electrochemically polymerized at abnormally high voltages, thereby increasing the internal resistance of the battery and thus protecting it.

U.S. Pat. No. 6,074,777 describes incorporation of an aromatic additive such as phenyl-R-phenyl compounds (R=aliphatic hydrocarbon), fluorine-substituted biphenyl compounds, or 3-thiopheneacetonitrile into a non-aqueous rechargeable lithium battery. The additive is preferably used in an amount of about 2.5%.

It is an object of the invention to provide a non-aqueous electrolytic solution which is favorably employable for a lithium secondary battery and which shows high battery performances such as high electric capacity and high cycling performance, particularly, under the conditions that the maximum operating voltage exceeds 4.1 V and/or the battery is used at high temperatures such as 40° C. or higher.

It is another object of the invention to provide a lithium secondary battery which shows high battery performances such as high electric capacity and high cycling performance, particularly, under the conditions that the maximum operating voltage exceeds 4.1 V and/or the battery is used at high temperatures such as 40° C. or higher.

SUMMARY OF THE INVENTION

The present invention resides in a non-aqueous electrolytic solution which comprises a non-aqueous solvent and an electrolyte which further contains 0.001 to 0.8 weight % of a biphenyl derivative having the formula (I):

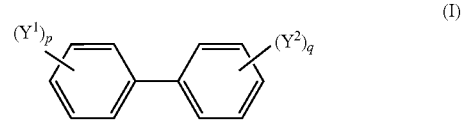

(I)

in which each of $Y^1$ and $Y^2$ independently represents a hydroxyl group, an alkoxy group, a hydrocarbyl group, a hydrogen atom, an acyloxy group, an alkoxycarbonyloxy group, an alkylsulfonyloxy group or a halogen atom, and each of p and q independently is an integer of 1 to 3.

More preferably, the biphenyl derivative has the following formula (II):

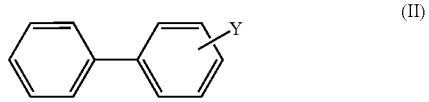

(II)

in which Y represents a hydroxyl group, an alkoxy group, a hydrocarbyl group, a hydrogen atom, an acyloxy group, an alkoxycarbonyloxy group, or an alkylsulfonyloxy group.

In the formulas (I) and (II), the alkoxy group preferably has a formula of $-OR^1$ in which $R^1$ is a hydrocarbyl group having 1 to 12 carbon atoms; the hydrocarbyl group preferably has a formula of $-R^2$ in which $R^2$ has 1 to 12 carbon atoms; the acyloxy group preferably has a formula of $-O-C(=O)-R^3$ in which $R^3$ is a hydrocarbyl group having 1 to 12 carbon atoms; the alkoxycarbonyl group preferably has a formula of $-O-C(=O)-O-R^4$ in which $R^4$ is a hydrocarbyl group having 1 to 12 carbon atoms; the alkylsulfonyloxy group preferably has a formula of $-O-S(=O)_2-R^5$ in which $R^5$ is a hydrocarbyl group having 1 to 12 carbon atoms; and a halogen atom can be F, Cl, Br or I.

DETAILED DESCRIPTION OF THE INVENTION

The non-aqueous electrolytic solution of the invention contains the biphenyl derivative of the formula (I) or the formula (II) in a very small amount such as 0.001 to 0.8 wt. %, preferably 0.01 to 0.5 wt. %, more preferably 0.03 to 0.3 wt. %. If the amount of the biphenyl derivative exceeds the upper limit, the incorporation of the biphenyl derivative does not give satisfactory improvements of the battery performances such as high electric capacity and high cycling performance. If the amount of the biphenyl derivative is less than 0.001 wt. %, no noticeable improvement is observed.

It is supposed that the appropriate amount of the biphenyl derivative forms an appropriately thin film on the positive electrode upon its decomposition thereon to improve the battery performances, particularly, the cycling performance. If the amount of the additive, i.e., the biphenyl derivative, is too larger, a thick film is produced on the positive electrode, and the thick film disturbs the cycling performance of the battery.

In the biphenyl derivatives of the formula (I) or the formula (II), the substituent such as $Y^1$, $Y^2$ or Y preferably is a hydrogen atom, a hydroxyl group, a linear chain alkoxy group such as methoxy, ethoxy, propoxy, or butoxy, a branched chain alkoxy group such as isopropoxy or isobutoxy, a cycloalkoxy group such as cyclopropoxy or cyclohexyloxy, an aryloxy group such as phenoxy, p-tolyl-oxy, or biphenylyloxy, a linear chain alkyl group such as methyl, ethyl, propyl, or butyl, a branched chain alkyl group such as isopropyl or isobutyl, a cycloalkyl group such as cyclopropyl or cyclohexyl, an aryl group such as phenyl, p-tolyl, or biphenylyl, an acyloxy group such as acetyloxy, propionyloxy, acryloyloxy, or benzoyloxy, an alkoxycarbonyloxy group such as methoxycarbonyloxy, ethoxycarbonyloxy, phenoxycarbonyloxy, or benzyloxycarbonyloxy, or an alkylsulfonyloxy group such as methanesulfonyloxy, ethanesulfonyloxy, or benzensulfonyloxy.

Preferred are biphenyl derivatives of the formula (II). Examples of the biphenyl derivatives of the formula (II) include 2-hydroxybiphenyl, 3-hydroxybiphenyl, 4-hydroxybiphenyl, 2-methoxybiphenyl, 3-methoxybiphenyl, 4-methoxybiphenyl, p-diphenylylphenyl ether, 4-biphenyl-yl, p-tolyl ether 4-biphenylyl ether, 2-methylbiphenyl, 3-methylbiphenyl, 4-methylbiphenyl, 4-ethylbiphenyl, 4-propylbiphenyl, 4-isopropylbiphenyl, 4-butylbiphenyl, 4-t-butylbiphenyl, 4-cyclohexylbiphenyl, o-terphenyl (Y=phenyl), m-terphenyl, p-terphenyl, 2-methyl-o-terphenyl tosyl), o-qarterphenyl (Y=biphenylyl), biphenyl, 4-biphenylyl acetate (Y=acetyloxy), 4-biphenylyl benzoate (Y=benzyloxy), 4-biphenylyl benzylcarboxylate (Y=benzylcarbonyloxy), 2-biphenylyl propionate, 2-biphenylyl methylcarbonate (Y=methoxycarbonyloxy), 4-biphenylyl methylcarbonate, 4-biphenylyl butylcarbonate (Y=butoxy-carbonyloxy), 4-methanesulfonyloxybiphenyl, 4-ethanesulfonyloxybiphenyl, and 4-benzenesulfonyloxybiphenyl.

The non-aqueous electrolytic solution of the invention comprises a non-aqueous solvent which preferably comprises a combination of a cyclic carbonate and a linear chain carbonate. The non-aqueous solvent is also preferred to comprise a high dielectric constant solvent such as ethylene carbonate, propylene carbonate, or butylene carbonate, and a low viscosity solvent such as dimethyl carbonate, methyl ethyl carbonate, diethyl carbonate, tetrahydrofuran, 2-methyltetrahydrofuran, 1,4-dioxane, 1,2-dimethoxyethane, 1,2-diethoxyethane, 1,2-dibutoxyethane, γ-butyrolactone, acetonitrile, methyl propionate, or dimethylformamide. The high dielectric constant solvent and the low viscosity solvent are preferably employed in a volume ratio of 1:9 to 4:1, preferably, 1:4 to 7:3 (former:latter).

The non-aqueous solvent may contain a phosphate ester such as triethyl phosphate, tributyl phosphate, or trioctyl phosphate, vinylene carbonate, and 1,3-propane-sultone.

Examples of the electrolytes include $LiPF_6$, $LiBF_4$, $LiClO_4$, $LiN(SO_2CF_3)_2$, $LiN(SO_2C_2F_5)_2$, $LiC(SO_2CF_3)_3$, $LiPF_3(CF_3)_3$, $LiPF_3(C_2F_5)_3$, $LiPF_4(C_2F_5)_2$, $LiPF_3(iso-C_3F_7)_3$, and $LiPF_5(iso-C_3F_7)$. The electrolytes can be employed singly or in combination. Generally, the electrolyte can be dissolved in the non-aqueous solvent in such an amount to give an electrolytic solution of 0.1 M to 3 M, preferably 0.5 M to 1.5 M.

The non-aqueous electrolytic solution of the invention is prepared, for instance, by dissolving the electrolyte in a mixture of a cyclic carbonate and a linear chain carbonate.

The non-aqueous electrolytic solution of the invention is preferably employed for manufacturing a lithium secondary battery. Materials other than the electrolytic solution are known for the manufacture lithium secondary battery, and the known materials can be employed without specific limitations.

For instance, the positive electrode active material can be a complex metal oxide comprising lithium and at least one metal element selected from the group consisting of cobalt, nickel, manganese, chromium, vanadium and iron. Examples of the complex metal oxides include $LiCoO_2$, $LiMn_2O_4$, and $LiNiO_2$.

The positive electrode can be prepared by kneading a mixture of the above-mentioned positive electrode active material, an electro-conductive agent such as acetylene black or carbon black, a binder such as poly(vinylidene fluoride) (PVDF) or polytetrafluoroethylene (PTFE), and an 1-methyl-2-pyrrolidone solvent to produce a positive electrode composition, coating the positive electrode composition on a metal plate such as aluminum foil or stainless sheet, drying the coated composition, molding the dry film under pressure, and then heating the molded film under reduced pressure at 50 to 250° C. for 2 hours.

The negative electrode preferably comprises a natural or artificial graphite having a lattice spacing (or lattice distance, in terms of $d_{002}$) of 0.335 to 0.340 nm. Other known negative electrode materials such as thermally decomposed carbonaceous articles, cokes, thermally fired polymer articles, and carbon fibers can be employed.

The negative electrode can be prepared by kneading a mixture of the above-mentioned graphite, a binder such as PVDF, PTFE or ethylene-propylene diene terpolymer (EPDM), and an 1-methyl-2-pyrrolidone solvent to produce a negative electrode composition, coating the negative electrode composition on a metal plate such as aluminum foil or stainless sheet, drying the coated composition at 50 to 250°.

There are no specific limitations with respect to the structure of the lithium secondary battery of the invention. For instance, the lithium secondary battery can be a battery of coin type comprising a positive electrode, a negative electrode, plural separators, and the electrolytic solution, or a cylindrical, prismatic or laminate battery.

The lithium secondary battery of the invention is preferably employed in the operating voltage range having the maximum operating voltage exceeding 4.1 V, more preferably 4.2 V, most preferably 4.3 V. The cut-off voltage preferably is higher than 2.0 V, more preferably is higher than 2.5 V. The battery is generally operated at a constant current discharge of 0.1 to 2 C. The charge-discharge cycles are preferably operated at temperatures of 20 to 100° C., more preferably 40 to 80° C.

Example 1

1) Preparation of Electrolytic Solution

A non-aqueous solvent, i.e., a mixture (1:2, volume ratio) of propylene carbonate (PC) and diethyl carbonate (DEC), was prepared. Subsequently, $LiPF_6$ was dissolved in the non-aqueous solvent to give a 1M concentration solution. Further, biphenyl was added to give a 0.1 wt. % solution. Thus, an electrolytic solution was prepared.

2) Preparation of Lithium Secondary Battery and Measurement of Battery Performances $LiCoO_2$ (positive electrode active material, 80 wt. %), acetylene black (electro-conductive material, 10 wt. %), and poly(vinylidene fluoride) (binder, 10 wt. %) were mixed. The resulting mixture was diluted with 1-methyl-2-pyrrolidone. Thus produced positive electrode composition was coated on aluminum foil, dried, molded under pressure, and heated to give a positive electrode.

Natural graphite ($d_{002}$=0.3354, 90 wt. %) and poly-(vinylidene fluoride) (binder, 10 wt. %) were mixed. The mixture was then diluted with 1-methyl-2-pyrrolidone. Thus produced negative electrode composition was coated on copper foil, dried, molded under pressure, and heated, to give a negative electrode.

The positive and negative electrodes, a micro-porous polypropylene film separator, and the electrolytic solution were combined to give a coin-type battery (diameter: 20 mm, thickness: 3.2 mm).

The coin-type battery was charged for 6 hours at a high temperature (40° C.) with a constant electric current (0.8 mA) to reach 4.3 V and then the charging was continued under a constant voltage of 4.3 V. Subsequently, the battery was discharged to give a constant electric current (0.8 mA). The discharge was continued to give a terminal voltage of 2.7 V, The charge-discharge cycle was repeated 100 times.

The initial discharge capacity was 1.03 (relative value based on 1 for that measured in a battery of Comparison Example 1 which contained no biphenyl in the electrolytic solution).

After the 100 cycle charge-discharge procedure, the discharge capacity was 90.5% of the initial discharge capacity. The low temperature characteristics were satisfactory.

Comparison Example 1

A secondary battery was prepared in the same manner as in Example 1, except for adding no biphenyl to the solvent.

The prepared secondary battery was subjected to the 100 cycle charge-discharge procedure.

After the 100 cycle charge-discharge procedure, the discharge capacity was 63.8% of the initial discharge capacity.

Comparison Example 2

A secondary battery was prepared in the same manner as in Comparison Example 1.

Thus prepared battery was charged in the same manner as in Example 1, except that the charging procedure was performed to reach 4.1 V and then the charging was continued under a constant voltage of 4.1 V.

The prepared secondary battery was subjected to the 100 cycle charge-discharge procedure.

The initial discharge capacity was 0.90 (relative value based on 1 for that measured in a battery of Comparison Example 1 which contained no biphenyl in the electrolytic solution).

After the 100 cycle charge-discharge procedure, the discharge capacity was 75.3% of the initial discharge capacity.

Comparison Example 3

A secondary battery was prepared in the same manner as in Example 1, except that biphenyl was added to the solvent in an amount of 2.5 wt. %.

The prepared secondary battery was subjected to the 100 cycle charge-discharge procedure.

The initial discharge capacity was 1.00 (relative value based on 1 for that measured in a battery of Comparison Example 1 which contained no biphenyl in the electrolytic solution).

After the 100 cycle charge-discharge procedure, the discharge capacity was 20.7% of the initial discharge capacity.

Comparison Example 4

A secondary battery was prepared in the same manner as in Example 1, except that biphenyl was added to the solvent in an amount of 2.5 wt. %.

Thus prepared battery was charged in the same manner as in Example 1, except that the charging procedure was performed at 20° C. (ambient temperature).

The prepared secondary battery was subjected to the 100 cycle charge-discharge procedure.

The initial discharge capacity was 1.00 (relative value based on 1 for that measured in a battery of Comparison Example 1 which contained no biphenyl in the electrolytic solution).

After the 100 cycle charge-discharge procedure, the discharge capacity was 62.2% of the initial discharge capacity.

Comparison Example 5

A secondary battery was prepared in the same manner as in Example 1, except that biphenyl was added to the solvent in an amount of 2.5 wt. %.

Thus prepared battery was charged in the same manner as in Example 1, except that the charging procedure was performed to reach 4.1 V and then the charging was continued under a constant voltage of 4.1 V.

The prepared secondary battery was subjected to the 100 cycle charge-discharge procedure.

The initial discharge capacity was 0.90 (relative value based on 1 for that measured in a battery of Comparison Example 1 which contained no biphenyl in the electrolytic solution).

After the 100 cycle charge-discharge procedure, the discharge capacity was 73.7% of the initial discharge capacity.

Comparison Example 6

A secondary battery was prepared in the same manner as in Example 1, except that 0.1 wt. % of biphenyl was replaced with 2.5 wt. % of 2,2-diphenylpropane.

The prepared secondary battery was subjected to the 100 cycle charge-discharge procedure.

The initial discharge capacity was 1.00 (relative value based on 1 for that measured in a battery of Comparison Example 1 which contained no biphenyl in the electrolytic solution).

After the 100 cycle charge-discharge procedure, the discharge capacity was 58.8% of the initial discharge capacity.

Example 2

A secondary battery was prepared in the same manner as in Example 1, except that 0.1 wt. % of biphenyl was replaced with 0.05 wt. % of 4-methoxybiphenyl.

The prepared secondary battery was subjected to the 100 cycle charge-discharge procedure.

The initial discharge capacity was 1.03 (relative value based on 1 for that measured in a battery of Comparison Example 1 which contained no biphenyl in the electrolytic solution).

After the 100 cycle charge-discharge procedure, the discharge capacity was 90.8% of the initial discharge capacity.

Example 3

A secondary battery was prepared in the same manner as in Example 1, except that 0.1 wt. % of biphenyl was replaced with 0.1 wt. % of 4-methoxybiphenyl.

The prepared secondary battery was subjected to the 100 cycle charge-discharge procedure.

The initial discharge capacity was 1.03 (relative value based on 1 for that measured in a battery of Comparison Example 1 which contained no biphenyl in the electrolytic solution).

After the 100 cycle charge-discharge procedure, the discharge capacity was 92.4% of the initial discharge capacity.

Example 4

A secondary battery was prepared in the same manner as in Example 1, except that 0.1 wt. % of biphenyl was replaced with 0.3 wt. % of 4-methoxybiphenyl.

The prepared secondary battery was subjected to the 100 cycle charge-discharge procedure.

The initial discharge capacity was 1.03 (relative value based on 1 for that measured in a battery of Comparison Example 1 which contained no biphenyl in the electrolytic solution).

After the 100 cycle charge-discharge procedure, the discharge capacity was 90.7% of the initial discharge capacity.

Example 5

A secondary battery was prepared in the same manner as in Example 1, except that 0.1 wt. % of biphenyl was replaced with 0.5 wt. % of 4-methoxybiphenyl.

The prepared secondary battery was subjected to the 100 cycle charge-discharge procedure.

The initial discharge capacity was 1.03 (relative value based on 1 for that measured in a battery of Comparison Example 1 which contained no biphenyl in the electrolytic solution).

After the 100 cycle charge-discharge procedure, the discharge capacity was 88.8% of the initial discharge capacity.

Example 6

A secondary battery was prepared in the same manner as in Example 1, except that 0.1 wt. % of biphenyl was replaced with 0.1 wt. % of 4-hydroxybiphenyl.

The prepared secondary battery was subjected to the 100 cycle charge-discharge procedure.

The initial discharge capacity was 1.00 (relative value based on 1 for that measured in a battery of Comparison Example 1 which contained no biphenyl in the electrolytic solution).

After the 100 cycle charge-discharge procedure, the discharge capacity was 91.4% of the initial discharge capacity.

Example 7

A secondary battery was prepared in the same manner as in Example 1, except that 0.1 wt. % of biphenyl was replaced with 0.1 wt. % of o-terphenyl.

The prepared secondary battery was subjected to the 100 cycle charge-discharge procedure.

The initial discharge capacity was 1.03 (relative value based on 1 for that measured in a battery of Comparison Example 1 which contained no biphenyl in the electrolytic solution).

After the 100 cycle charge-discharge procedure, the discharge capacity was 91.2% of the initial discharge capacity.

Example 8

A secondary battery was prepared in the same manner as in Example 1, except that 0.1 wt. % of biphenyl was replaced with 0.1 wt. % of 4-biphenylyl acetate.

The prepared secondary battery was subjected to the 100 cycle charge-discharge procedure.

The initial discharge capacity was 1.03 (relative value based on 1 for that measured in a battery of Comparison Example 1 which contained no biphenyl in the electrolytic solution).

After the 100 cycle charge-discharge procedure, the discharge capacity was 90.1% of the initial discharge capacity.

Example 9

A secondary battery was prepared in the same manner as in Example 1, except that 0.1 wt. % of biphenyl was replaced with 0.1 wt. % of 4-biphenyl)-1 methylcarbonate.

The prepared secondary battery was subjected to the 100 cycle charge-discharge procedure.

The initial discharge capacity was 1.03 (relative value based on 1 for that measured in a battery of Comparison Example 1 which contained no biphenyl in the electrolytic solution).

After the 100 cycle charge-discharge procedure, the discharge capacity was 90.7% of the initial discharge capacity.

Example 10

A secondary battery was prepared in the same manner as in Example 1, except that 0.1 wt. % of biphenyl was replaced with 0.1 wt. % of 4-methanesulfonyloxybiphenyl.

The prepared secondary battery was subjected to the 100 cycle charge-discharge procedure.

The initial discharge capacity was 1.03 (relative value based on 1 for that measured in a battery of Comparison Example 1 which contained no biphenyl in the electrolytic solution).

After the 100 cycle charge-discharge procedure, the discharge capacity was 90.3% of the initial discharge capacity.

Example 11

A secondary battery was prepared in the same manner as in Example 1, except that the natural graphite was replaced with artificial graphite.

The prepared secondary battery was subjected to the 100 cycle charge-discharge procedure.

The initial discharge capacity was 1.06 (relative value based on 1 for that measured in a battery of Comparison Example 1 which contained no biphenyl in the electrolytic solution).

After the 100 cycle charge-discharge procedure, the discharge capacity was 93.2% of the initial discharge capacity.

Example 12

A secondary battery was prepared in the same manner as in Example 11, except that $LiCoO_2$ of the positive electrode material was replaced with $LiMn_2O_4$.

The prepared secondary battery was subjected to the 100 cycle charge-discharge procedure.

The initial discharge capacity was 0.85 (relative value based on 1 for that measured in a battery of Comparison Example 1 which contained no biphenyl in the electrolytic solution).

After the 100 cycle charge-discharge procedure, the discharge capacity was 93.0% of the initial discharge capacity.

The preparations and evaluations of the batteries of Examples 1 to 12 and Comparison Examples 1 to 6 are summarized in Table 1. In Table 1, the standard conditions are as follows:

Positive electrode: $LiCoO_2$
Negative electrode: natural graphite
Terminal voltage for charging: 4.3 V
Cycle temperature: 40° C.
Electrolytic solution: 1M $LiPF_6$ in EC/DEC=1/2

TABLE 1

| Example | Additive (wt. %) | Initial discharge capacity (relative) | 100 Cycle retention |
| --- | --- | --- | --- |
| Ex. 1 | biphenyl (0.1) | 1.03 | 90.5% |
| Com. 1 | none | 1 | 63.8% |
| Com. 2* | none | 0.90 | 75.3% |
| Com. 3 | biphenyl (2.5) | 1.00 | 20.7% |
| Com. 4* | biphenyl (2.5) | 1.00 | 62.2% |
| Com. 5* | biphenyl (2.5) | 0.90 | 73.7% |
| Com. 6 | 2,2-diphenyl-propane (2.5) | 1.00 | 58.8% |
| Ex. 2 | 4-methoxy-biphenyl (0.05) | 1.03 | 90.8% |
| Ex. 3 | 4-methoxy-biphenyl (0.1) | 1.03 | 92.4% |
| Ex. 4 | 4-methoxy-biphenyl (0.3) | 1.03 | 90.7% |
| Ex. 5 | 4-methoxy-biphenyl (0.5) | 1.03 | 88.8% |
| Ex. 6 | 4-hydroxy-biphenyl (0.1) | 1.00 | 91.4% |
| Ex. 7 | o-terphenyl (0.1) | 1.03 | 91.2% |
| Ex. 8 | 4-biphenylyl acetate (0.1) | 1.03 | 90.1% |
| Ex. 9 | 4-biphenylyl methyl-carbonate (0.1) | 1.03 | 90.7% |
| Ex. 10 | 4-methanesulfonyloxy-biphenyl (0.1) | 1.03 | 90.3% |
| Ex. 11* | biphenyl (0.1) | 1.06 | 93.2% |
| Ex. 12* | biphenyl (0.1) | 0.85 | 93.0% |

Remarks:
Com. Ex. 2 (Terminal voltage for charging: 4.1 V)
Com. Ex. 4 (Cycle temperature: 20° C.)
Com. Ex. 5 (Terminal voltage for charging: 4.1 V)
Example 11 (Negative electrode: artificial graphite)
Example 12 (Negative electrode: artificial graphite, Positive electrode: $LiMn_2O_4$)

What is claimed is:

1. A method for operating a lithium secondary battery comprising cyclically charging and discharging the battery in a voltage range having a maximum operating voltage exceeding 4.2 V, the battery comprising a positive electrode, a negative electrode consisting of graphite and a binder, and a non-aqueous electrolytic solution comprising a cyclic carbonate, a linear chain carbonate and an electrolyte, the non-aqueous electrolytic solution further containing 0.03 to 0.5 weight % of biphenyl.

2. The method of claim 1, wherein the non-aqueous electrolytic solution contains the biphenyl in an amount of 0.05 to 0.5 weight %.

3. The method of claim 1, wherein the positive electrode comprises a complex oxide comprising lithium and at least one metal element selected from the group consisting of cobalt, nickel, manganese, chromium, vanadium and iron.

4. The method of claim 1, wherein the cyclic carbonate comprises at least one compound selected from the group consisting of ethylene carbonate, propylene carbonate and butylene carbonate.

5. The method of claim 1, wherein the linear chain carbonate comprises at least one compound selected from the group consisting of dimethyl carbonate, methyl ethyl carbonate and diethyl carbonate.

6. The method of claim 1, wherein the lithium secondary battery is cyclically charged and discharged under such condition that 100 cycle retention is not less than 88.8%.

* * * * *